(12) United States Patent
Zhang et al.

(10) Patent No.: US 10,001,182 B2
(45) Date of Patent: Jun. 19, 2018

(54) ACTUATOR OF ELECTRIC PARKING BRAKE SYSTEM

(71) Applicant: Johnson Electric S.A., Murten (CH)

(72) Inventors: Yuan Chun Zhang, Shenzhen (CN); Fa Yun Qi, Shenzhen (CN); Jin An Nie, Shenzhen (CN); Rui Feng Qin, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 0 days. days.

(21) Appl. No.: 14/992,302

(22) Filed: Jan. 11, 2016

(65) Prior Publication Data

US 2016/0201745 A1 Jul. 14, 2016

(30) Foreign Application Priority Data

Jan. 9, 2015 (CN) .......................... 2015 1 0011856

(51) Int. Cl.
*F16D 41/067* (2006.01)
*F16D 65/16* (2006.01)
*F16D 121/24* (2012.01)
*F16D 125/50* (2012.01)
*F16D 127/06* (2012.01)

(52) U.S. Cl.
CPC .......... *F16D 65/16* (2013.01); *F16D 2121/24* (2013.01); *F16D 2125/50* (2013.01); *F16D 2127/06* (2013.01)

(58) Field of Classification Search
CPC ............... F16D 41/067; F16D 2127/06; F16D 2125/50; F16D 2121/24
See application file for complete search history.

(56) References Cited

U.S. PATENT DOCUMENTS

| | | | | |
|---|---|---|---|---|
| 6,481,550 B2 * | 11/2002 | Yamamoto | ............... | F16D 15/00 192/44 |
| 6,761,252 B1 * | 7/2004 | Weiler | ................... | B60T 13/741 188/71.8 |
| 7,832,542 B2 * | 11/2010 | Byun | ..................... | F16D 41/066 192/223.2 |
| 7,880,351 B2 * | 2/2011 | Strueber | ................. | F16D 41/10 310/77 |
| 2010/0320042 A1 * | 12/2010 | Giering | ................. | B60T 13/741 188/162 |
| 2014/0069751 A1 * | 3/2014 | Park | ..................... | F16D 65/0075 188/72.4 |
| 2014/0166413 A1 * | 6/2014 | Giering | ................. | B60T 13/741 188/156 |

(Continued)

FOREIGN PATENT DOCUMENTS

JP 2001214946 8/2001

*Primary Examiner* — Bradley T King
(74) *Attorney, Agent, or Firm* — Muncy, Geissler, Olds & Lowe, P.C.

(57) ABSTRACT

An actuator of an electric parking brake system includes a motor, an output member, and a transmission device. The transmission device includes a housing, a self-locking unit and a transmission unit. The self-locking unit includes a fixed sleeve, and a driving member, a driven member and a lock holder that are rotatable with respect to the sleeve. The lock holder supports lock elements arranged to prevent the driven member from turning unless it is driven by the driving member. A planetary gear unit may be provided as part of the transmission device.

20 Claims, 10 Drawing Sheets

(56) References Cited

U.S. PATENT DOCUMENTS

2015/0266568 A1\* 9/2015 Evenor .................. F16D 65/16
                                                      188/162
2016/0223040 A1\* 8/2016 Watzek .................. F16D 65/50

\* cited by examiner

ACTUATOR OF ELECTRIC PARKING BRAKE SYSTEM

CROSS REFERENCE TO RELATED APPLICATIONS

This non-provisional patent application claims priority under 35 U.S.C. § 119(a) from Patent Application No. 201510011856.3 filed in The People's Republic of China on Jan. 9, 2015, the entire contents of which are hereby incorporated by reference.

FIELD OF THE INVENTION

This invention relates to an actuator of an electric parking brake system for a vehicle and in particular, to an actuator having a self-locking mechanism.

BACKGROUND OF THE INVENTION

A parking brake system for a vehicle is designed to prevent movement of a parked vehicle. A traditional parking brake system is manually operated. The driver needs to physically pull a lever to apply the parking brake. Electric parking brake (EPB) systems replace the traditional parking brake system. The EPB system includes a number of actuators, each having an electric motor, to operate the brakes of the vehicle. The actuator may include a lead screw or a ball screw. The user presses a button to operate the motor to rotate the lead screw or the ball screw of the actuator, thereby applying the brakes.

However, the actuator using the lead screw has a low efficiency. Although the use of the ball screw can improve the efficiency for the actuator, the actuator cannot self-lock. If the vehicle is positioned on a slope, the vehicle may start moving after applying the brakes as the actuator 'relaxes'. Alternatively, the motor needs to remain active the entire time the parking brake is active, which is not a desirable situation due to the obvious safety issues.

SUMMARY OF THE INVENTION

Hence there is a desire for an actuator having a self-locking mechanism, suitable for use in an electric parking braking system and for an electric parking braking system incorporating a self-locking mechanism.

Accordingly, in one aspect thereof, the present invention provides an actuator of an electric parking brake system, comprising: a motor; an output member; and a transmission device connected between the motor and the output member, the transmission device comprising a housing, and a self-locking unit and a transmission unit that are received in the housing, the self-locking unit comprising: a sleeve fixed with respect to the housing, a driving member, a driven member and a holder, all arranged coaxially with the sleeve and are rotatable with respect to the sleeve, the driving member and the driven member having transmission components configured to engage with each other, the holder being rotatably sleeved on the sleeve and located in the driven member, and the holder is provided with a plurality of lock elements, wherein each of the lock elements extend beyond the holder in a radial direction, and is located between a radially inner wall surface of the driven member and a radially outer wall surface of the sleeve, a distance between the inner wall surface of the driven member and the outer wall surface of the sleeve is configured to gradually decrease from the center of the inner wall surface of the driven member to two sides of the inner wall surface of the driven member, in a circumferential direction, a greatest distance is greater than a diameter of the lock element, and a smallest distance is smaller than the diameter of the lock element, whereby when the driving member rotates the driven member, the holder is rotated by the driving member to maintain the lock element located approximately at a position corresponding to the greatest distance; and when the driven member rotates without the driving member, the inner wall surface of the driven member rotates with respect to the holder to allow the lock element to move towards a position corresponding to the smallest distance, to stop further rotation of the driven member with respect to the sleeve.

Preferably, the holder protrudes radially outwardly to form a plurality of protruding blocks, and the protruding blocks are arranged at intervals in a circumferential direction of the holder, and each protruding block supports a respective one of the lock elements.

Preferably, the driven member is provided with a plurality of stoppers spaced at intervals in the circumferential direction of the driven member, the driving member is formed with at least one outer driving block and one inner driving block disposed radially inwardly from the outer driving block, each stopper corresponds to one protruding block in the radial direction and is spaced from the protruding block, an inner wall surface of the stopper facing the protruding block is the inner wall surface of the driven member, and the outer driving block protrudes into a position between two adjacent stoppers, the inner driving block protrudes into a position between two adjacent protruding blocks, and the outer driving block together with the stopper form the transmission components.

Preferably, the inner wall surface of the stopper comprises two intersecting planes, and a projection of the inner wall surface in an axial direction has a V shape.

Preferably, a plurality of outer driving blocks are provided, and each outer driving block extends radially inwardly to form the respective inner driving block, and in the circumferential direction, the outer driving blocks and the stoppers are alternately arranged, the inner driving blocks and the protruding blocks are alternately arranged, and a distance between adjacent protruding blocks is greater than a width of the inner driving block, and a distance between adjacent stoppers is greater than a width of the outer driving block.

Preferably, a width of the inner driving block in the circumferential direction is greater than a width of the outer driving block in the circumferential direction, and two sides of the inner driving block protrude beyond the outer driving block.

Preferably, the sleeve comprises a fixed portion and a sleeve body extending from the fixed portion, and the fixed portion is fixed to the housing.

Preferably, the transmission unit comprises an input gear and an output gear which are drivably connected, and the self-locking unit is connected between the shaft of the motor and the input gear of the transmission unit.

Preferably, the driven member of the self-locking unit is integrally formed with the input gear of the transmission unit.

Preferably, the sleeve comprises a fixed portion and a sleeve body extending from the fixed portion, and the fixed portion of the sleeve and the housing are formed integrally as a monolithic structure by insert molding.

Preferably, an outer circumference of the fixed portion of the sleeve has a non-circular shape.

Alternatively, the transmission device further comprises a planetary gear unit, and the self-locking unit is connected between the transmission unit and the planetary gear unit.

Preferably, the transmission unit comprises an output gear, and the driving member of the self-locking unit is fixedly connected to the output gear or is integrally formed with the output gear.

Preferably, the planetary gear unit comprises a sun gear, and the driven member of the self-locking unit is fixedly connected to the sun gear or is integrally formed with the sun gear.

Preferably, the transmission device further comprises a fixed shaft fixed to the housing, the sleeve comprises a fixed portion fixedly sleeved on the fixed shaft, and a sleeve body extending axially outwardly from a periphery of the fixed portion, and the sleeve body and the fixed shaft are spaced from each other in the radial direction to form an annular space between the sleeve body and the fixed shaft.

Preferably, the driving member comprises a body arranged to be superposed on the sleeve body of the sleeve, a shaft seat extending axially from the center of the body, and a driving block extending axially from the body, and the shaft seat is rotatably sleeved on the fixed shaft and is received in the annular space.

Preferably, the driven member comprises a connecting portion superposed on the fixed portion of the sleeve, and a stopper extending axially from an outer periphery of the connecting portion.

Preferably, the holder surrounds the sleeve body, and is disposed between the connecting portion and the body.

Preferably, a rubber gasket is disposed between the casing and the motor and/or between the housing and the casing.

According to a second aspect, the present invention provides an electric parking brake system incorporating at least one actuator according to the first aspect.

BRIEF DESCRIPTION OF THE DRAWINGS

A preferred embodiment of the invention will now be described, by way of example only, with reference to figures of the accompanying drawings. In the Figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
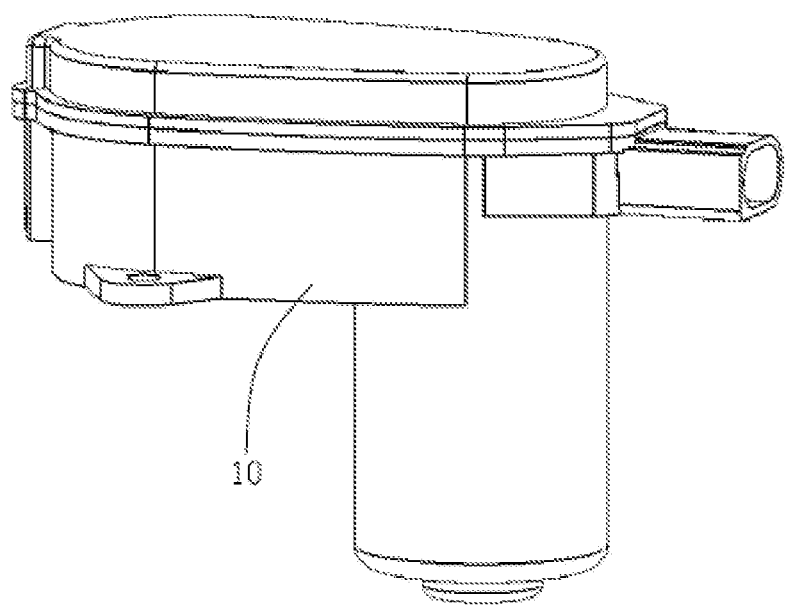
FIG. 1 illustrates an actuator of an electric parking brake system according to the preferred embodiment of the present application.
Figure 2:
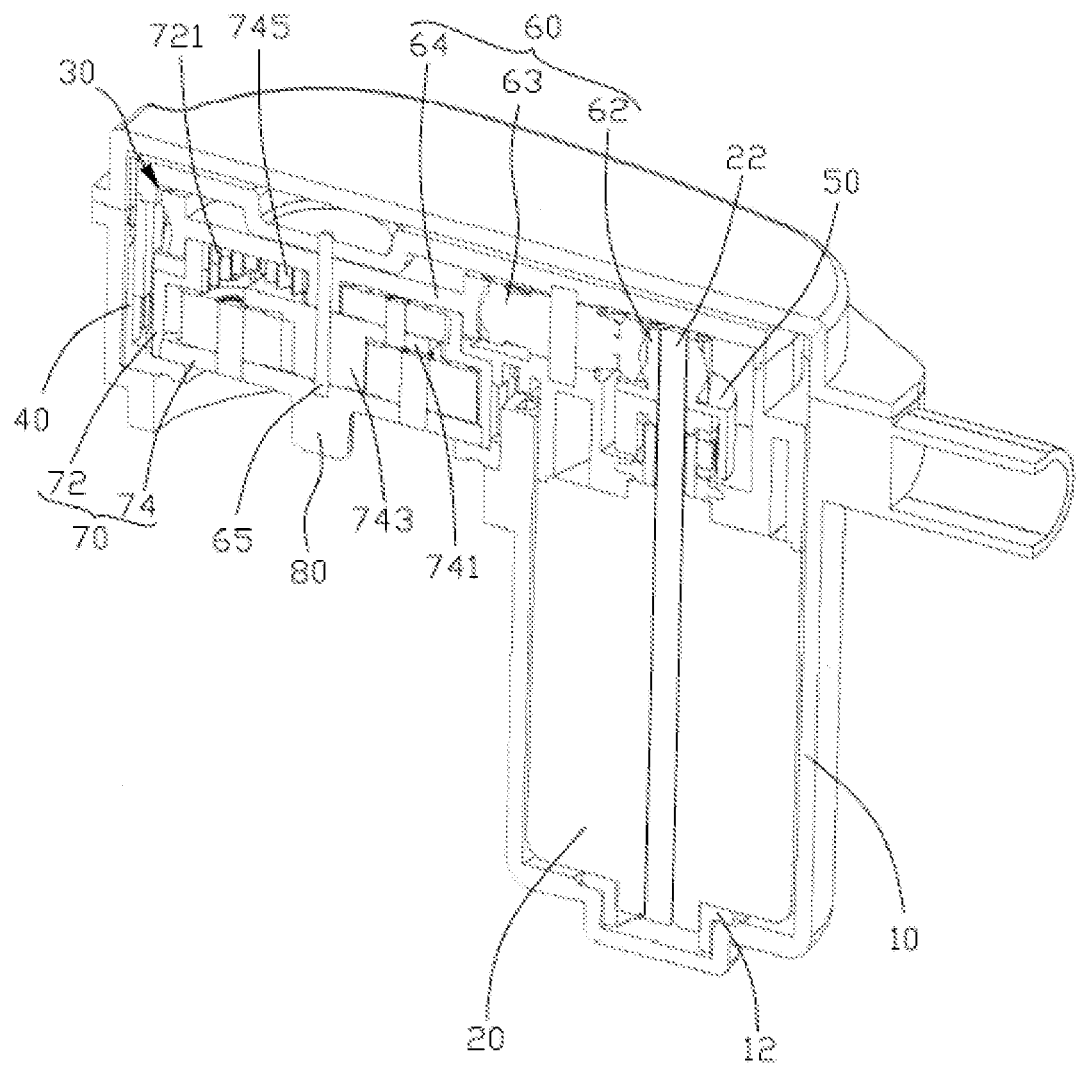
FIG. 2 is a sectional view of the actuator of FIG. 1.

FIGS. 1 and 2 show an actuator of an electric parking brake (EPB) system according to the preferred exemplary embodiment of the present application. The actuator includes a casing 10. A motor 20 and a transmission device 30 are received in the casing 10. The transmission device 30 connects the motor to an output member 80, to drive a brake via the output member 80, thereby applying or releasing the brake of the vehicle.

The motor 20 is provided with a shaft 22, and one end of the shaft 22 (the top end as shown) protrudes to be connected to the transmission device 30. The transmission device 30 includes a self-locking unit 50, a transmission unit 60, and a planetary gear unit 70, all received in a housing 40. In this embodiment, the self-locking unit 50 is connected to the top end of the shaft 22 and is arranged coaxially with the shaft 22. The housing 40 has an opening to allow the shaft 22 to enter. The transmission unit 60 and the self-locking unit 50 are arranged side by side. The transmission unit 60 connects the self-locking unit to the planetary gear unit 70. When the motor 20 is operated, rotation of the shaft 22 is transmitted through the self-locking unit 50, the transmission unit 60 and the planetary gear unit 70 sequentially, to drive the output member 80, thus applying or releasing the brake. To dampen vibration in the operation, an annular washer or gasket 12 is provided between the casing 10 and the motor 20. An annular gasket may also be provided between the casing 10 and the transmission device 30. The gasket 12 may be made of rubber or another material that can absorb or dampen vibrations of the motor 20 and the transmission device 30.

Figure 3:
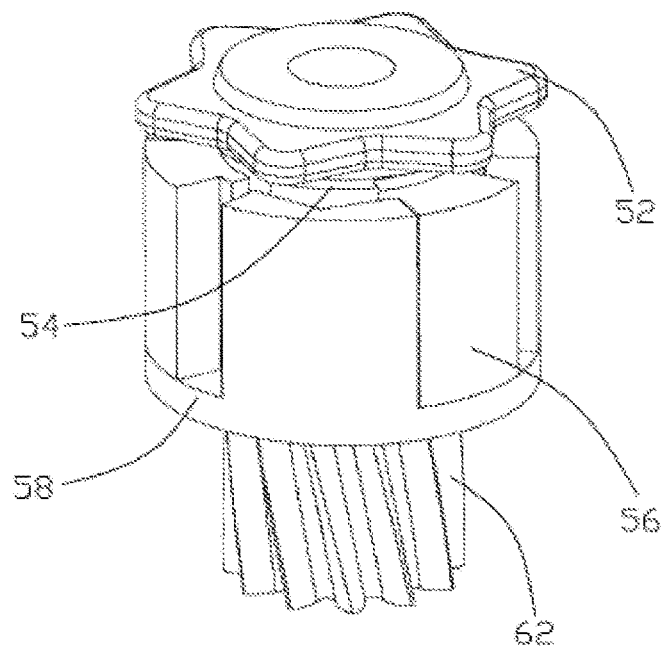
FIG. 3 is an assembly view showing a self-locking unit of the actuator.
Figure 4:
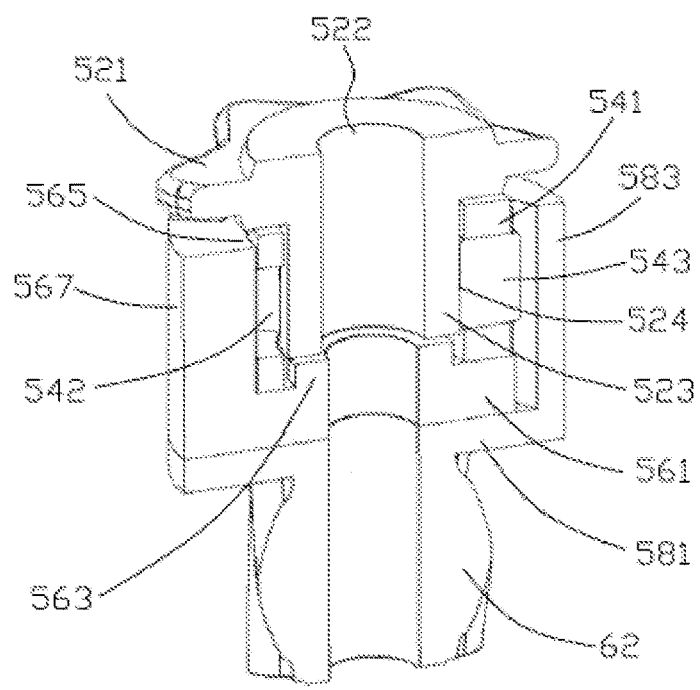
FIG. 4 is a sectional view of the self-locking unit of FIG. 3.
Figure 5:
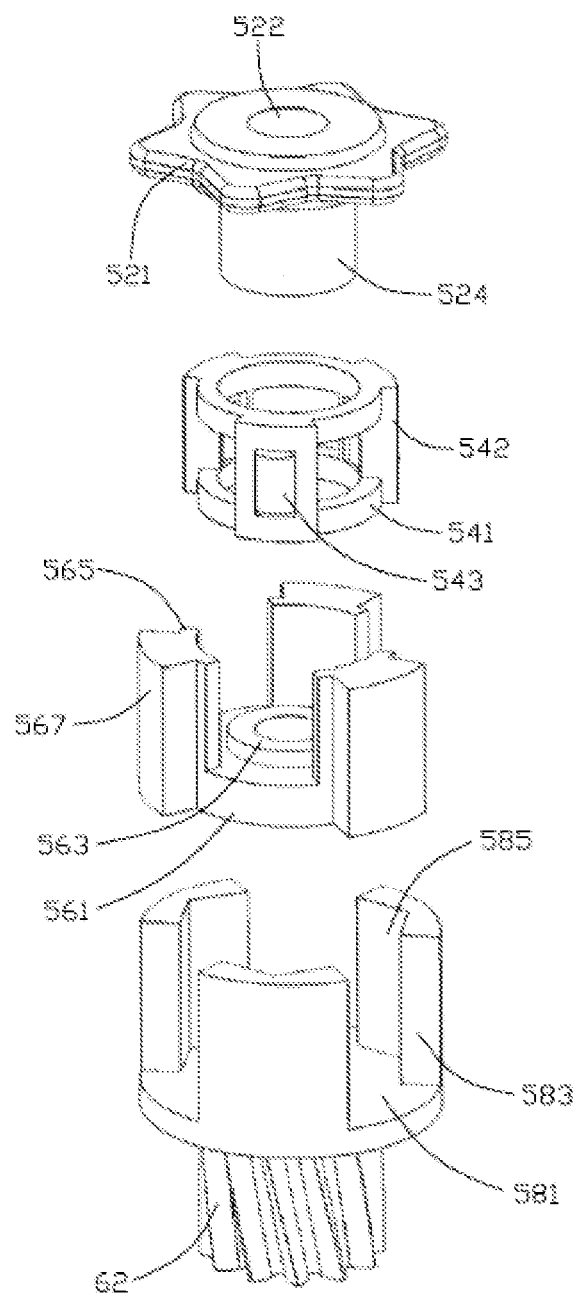
FIG. 5 is an exploded view of the self-locking unit of FIG. 3.

Referring to FIGS. 3, 4, and 5, it is to be noted that, the self-locking unit 50 is shown in FIGS. 3 to 5 viewed from the opposite direction to the self-locking unit 50 shown in FIG. 2. The self-locking unit 50 includes a sleeve 52, a lock holder 54, a driving member 56, and a driven member 58, and the four components are arranged coaxially. The sleeve 52, the driving member 56, and the driven member 58 are sequentially sleeved on the shaft 22, and the lock holder 54 is sleeved on the sleeve 52 to surround the sleeve 52 and is received in a void formed by the driving member 56 and the driven member 58.

The sleeve 52 is fixed and cannot rotate. The sleeve has a fixed portion 521 configured to be fixedly connected to the housing 40 and a sleeve body 523 extending from the fixed portion 521. The fixed portion 521 has a shaft hole 522 formed at the center to allow the shaft 22 to pass through. Preferably, the fixed portion 521 is embedded in the housing 40 by insert molding. For increasing the connection strength between the fixed portion 521 and the housing 40, a profile of an outer edge of the fixed portion 521 is non-circular, irregular or wavy. In this embodiment, the fixed portion 521 is of an approximate star-shaped structure. In other embodiments, the fixed portion 521 may be in a non-circular shape such as a polygonal shape, or other irregular shape. The sleeve body 523 extends outwards axially from an edge of the shaft hole 522 of the fixed portion 521. The sleeve body 523 surrounds the shaft 22, and has an inner diameter slightly greater than the diameter of the shaft 22, so that the shaft can rotate freely within the sleeve 52.

The lock holder 54 is rotatably sleeved on the sleeve body 523. The lock holder 54 includes two support seats 541 arranged in parallel with each other and spaced from each other axially. The support seats may be annular rings as shown in FIG. 5. Several protruding blocks 542 connect the two supporting seats 541. The protruding blocks have radially extending through holes accommodating respective lock elements 543. The lock elements are preferably cylindrical rollers. Each supporting seat 541 has an inner diameter slightly greater than an outer diameter of the sleeve body 523, and a slight space is formed between the supporting seats 541 and an outer wall surface 524 of the sleeve body 523 in a radial direction. The axial ends of each of the protruding blocks 542 are respectively connected to radial outer peripheries of the supporting seats 541. The protruding blocks 542 are arranged at uniform intervals in a circumferential direction of the supporting seats 541, and outer wall surfaces of the protruding blocks 542 are located on a cylindrical surface coaxial with the supporting seat 541. The cylindrical surface has a diameter greater than an outer diameter of the supporting seats 541.

The lock elements 543 have a diameter greater than the width of the protruding blocks 542 in the radial direction, and an inner side and an outer side of the lock element 543 in the radial direction respectively protrude beyond the inner surface of the supporting seats 541 and the outer wall surface of the protruding block 542. In this embodiment, each of the lock elements 543 has a cylinder shape, and an axial direction of the lock element 543 is parallel to an axial direction of the lock holder 54. The lock elements 543 are evenly distributed circumferentially about the axis of the holder 54.

The driving member 56 is fixedly sleeved on the shaft 22 to rotate synchronously with the shaft 22. The driving member 56 includes a flat body 561, a shaft seat 563 formed at the center of the body 561, and an inner driving block 565 and an outer driving block 567 both extending from an outer periphery of the body 561 in an axial direction of the body 561. The inner driving block 565 is configured to interact with the holder 54, and the outer driving block 567 is configured to interact with the driven member 58. In this embodiment, the inner driving block 565 and the outer driving block 567 are integrally formed.

The shaft seat 563 extends axially from the center of the body 561 towards the sleeve 52. The shaft seat 563 has an inner diameter substantially equal to or slightly smaller than the diameter of the shaft 22. The shaft 22 passes through the shaft seat 563 and is fixedly connected to the shaft seat 563, Preferably, the connection is an interference fit, although other connection methods may be used. The shaft seat 563 has an outer diameter approximately equivalent to the outer diameter of the sleeve body 523 of the sleeve 52. One of the supporting seats 541 of the holder 54 surrounds the sleeve body 523 of the sleeve 52 and the shaft seat 563, and in the axial direction, the supporting seats 541 are located between the fixed portion 521 of the sleeve 52 and the body 561 of the driving member 56. Preferably, an axial height of the holder 54 is smaller than the sum of an axial height of the sleeve body 523 and an axial height of the shaft seat 563, thus the holder 54 is spaced from the sleeve body 523 by a slight distance in the axial direction, to reduce friction between the holder 54 and an end surface of the sleeve body 523 when the driving member 56 rotates with the shaft 22.

The outer driving block 567 and the inner driving block 565 are each a circular arc-shaped block. The inner driving block 565 extends axially from the outer periphery of the body 561 of the driving member 56 towards the fixed portion 521, and is spaced from the fixed portion 521 of the sleeve 52 by a certain distance in the axial direction, to avoid friction between the inner driving block 565 and the fixed portion 521 when the driving member 56 rotates. In this embodiment, multiple inner driving blocks 565 are provided, the number of the inner driving blocks 565 is the same as the number of the protruding blocks 542, and the inner driving blocks 565 are distributed at uniform intervals in a circumferential direction of the driving member 56. Inner surfaces of the inner driving blocks 565 are located in a cylindrical surface coaxial with the driving member 56, and the cylindrical surface has a diameter not smaller than the outer diameter of the supporting seats 541 and not greater than the diameter of the cylindrical surface in which the outer wall surfaces of the protruding blocks 542 are located. Preferably, the diameter of the cylindrical surface is slightly greater than the outer diameter of the supporting seats 541. An outer diameter of a cylindrical surface in which outer surfaces of the inner driving blocks 565 are located is the same as an outer diameter of the body 561, and is slightly greater than the diameter of the cylindrical surface in which the outer wall surfaces of the protruding blocks 542 of the holder 54 are located.

Each outer driving block 567 extends radially outwardly from an outer surface of a respective inner driving block 565. Outer surfaces of the outer driving blocks 567 are each a circular arc-shaped surface, and are located in a cylindrical surface coaxial with the driving member 56, the cylindrical surface has a diameter equivalent to an outer diameter of the driven member 58. In a circumferential direction, the outer driving block 567 has a width smaller than a width of the inner driving block 565, and the inner driving block 565 has two sides protruding beyond the outer driving block 567. When assembled, the inner driving blocks 565 surround the holder 54, and each inner driving block 565 is located between two adjacent protruding blocks 542, and the inner driving blocks 565 and the protruding blocks 542 are alternately distributed in the circumferential direction. The width of the inner driving blocks 565 in the circumferential direction is smaller than the distance between adjacent protruding blocks 542 in the circumferential direction, thus the inner driving block 565 is rotatable between adjacent protruding blocks 542. When rotating, the inner driving blocks 565 abut against the respective protruding block 542 to push the protruding block 542 to drive the holder 54 to rotate synchronously with the inner driving block 565.

The driven member 58 is rotatably connected to the shaft 22, and is driven by the driving member 56 to rotate synchronously with the driving member 56. The driven member 58 includes a connecting portion 581 rotatably sleeved on the shaft 22, and a stopper 583 extending from the connecting portion 581. In this embodiment, the connecting portion 581 is in a flat annular shape, and is superposed on the body 561 of the driving member 56, and the connecting portion 581, the body 561 of the driving member 56, the shaft seat 563, the sleeve body 523 and the fixed portion 521 of the sleeve 52, are arranged in the listed sequence. An inner diameter of the connecting portion 581 is slightly greater than the diameter of the shaft 22, to allow the shaft 22 and the connecting portion 581 rotate with respect to each other, and an outer diameter of the connecting portion 581 is equivalent to the diameter of a cylindrical surface in which the outer surfaces of the outer driving blocks 567 are located.

The stopper 583 extends axially from an outer periphery of the connecting portion 581 towards the fixed portion 521 of the sleeve 52. The number of stoppers 583 is the same as the number of protruding blocks 542 of the holder 54 and the stoppers 583 are arranged at uniform intervals in the circumferential direction. Each stopper 583 is located between two adjacent outer driving blocks 567 of the driving member 56, thus the stoppers 583 and the outer driving blocks 567 are alternately arranged in the circumferential direction. A width of the outer driving block 567 in the circumferential direction is smaller than the distance between adjacent stoppers 583 in the circumferential direction, therefore the outer driving block 567 is rotatable between the two adjacent stoppers 583. When the driving wheel 56 rotates, outer driving blocks 567 abut against the respective the stopper 583 to push the driven member 58 to rotate with the driving member 56.

In the radial direction, each stopper 583 corresponds to a respective protruding block 542 and the lock element 543 of the respective protruding block 542. The stopper 583 has an inner wall surface 585 facing the protruding block 542. In this embodiment, the inner wall surface 585 of the stopper 583 includes two planes intersecting with each other, forming a V shape when viewed in the axial direction. The distance between the inner wall surface 585 of the stopper 583 and the outer wall surface 524 of the sleeve body 523 of the sleeve 52 in the radial direction decreases linearly from the center of the inner wall surface 585, i.e., the intersecting line of the two planes, to the two sides in the circumferential direction. The greatest distance is the distance between the center of the inner wall surface 585 and the outer wall surface 524, and is slightly greater than the diameter of the lock element 543. The smallest distance is the distance between each of the two sides of the inner wall surface 585 and the outer wall surface 524, and is smaller than the diameter of the lock element 543. It can be appreciated that the inner wall surface 585 of the stopper 583 is not limited to the V shape structure shown in this embodiment. For example, it may be a smooth, internally concaved, curved surface. To avoid interference between the stopper 583 and the protruding block 542, the smallest inner diameter of the stopper 583 is slightly greater than the diameter of the cylindrical surface in which the outer wall surfaces of the protruding blocks 542 are located.

When the lock element 543 is located in a position corresponding to the center of the inner wall surface 585, the driven member 58 is rotatable with respect to the sleeve 52. When the driven member 58 rotates with respect to the driving member 56, the lock holder 54 keeps still and the lock element 543 becomes wedged or catch between the stopper and the sleeve, thereby preventing further rotation of the driven member 58.

As shown in FIG. 2, the transmission unit 60 is a multi-stage gear transmission and includes an input gear 62 and an output gear 64 engaged with each other, either directly or via one or more intermediate gears 63. The input gear 62 is connected to the driven member 58 of the self-locking unit 30 and the output gear 64 is connected to the planetary gear unit 70. In this embodiment, the input gear 62 and the driven member 58 are integrally formed and are sleeved on the shaft 22. The input gear 62 and the stoppers 583 are respectively located on opposite axial sides of the connecting portion 581 of the driven member 58. The output gear 64 and the planetary gear unit 70 are drivably connected.

The planetary gear unit 70 includes a gear case 72, and a single-stage or multi-stage planet gear set 74 received in the gear case 72. The single-stage or multi-stage planet gear set 74 is connected in series to a pivot shaft 65. Each stage of the planet gear set 74 includes a planet carrier 741, a sun gear 743, and multiple planet gears 745. The sun gear 743 is sleeved on the pivot shaft 65 and the multiple planet gears 745 are rotatably connected to the planet carrier 741 via a respective axle. An inner gear ring 721 is formed in the gear case 72 corresponding to the planet gears 745 of each stage. The planet gears 745 connect the sun gear 743 to the respective ring gear 721. The sun gear 743 of the first stage is fixedly connected to or integrally formed with the output gear 64. The sun gear 743 of the second stage is fixedly connected to or integrally formed with the planet carrier 741 of the first stage and the output member 80 is fixedly connected to or integrally formed with the planet carrier 741 of the second (last) stage. In this embodiment, the output member 80 is a cog.

Figure 6:
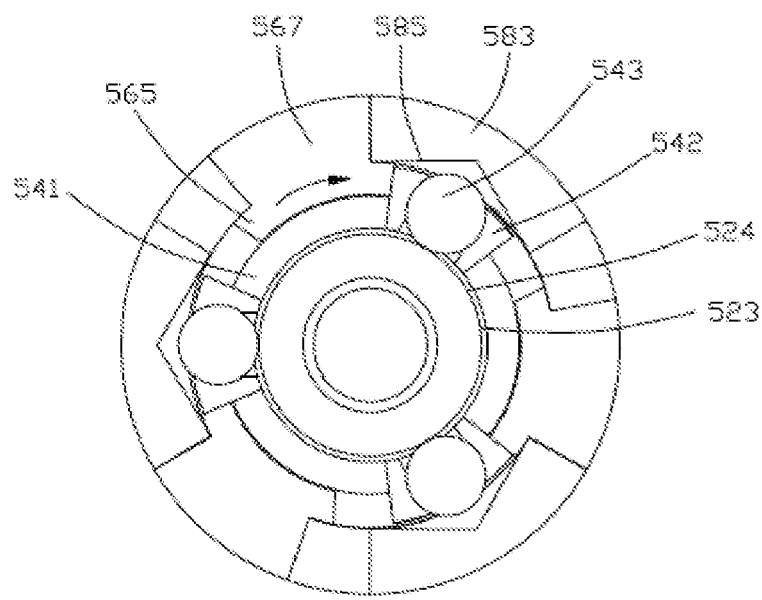
FIG. 6 is a schematic view showing the state of the self-locking unit when applying the brakes.

When the actuator is operated to apply the brake, the motor 20 rotates the shaft 22. Taking a clockwise rotational direction indicated by an arrow in FIG. 6 as an example, rotating the shaft 22 clockwise causes the driving member 56 of the self-locking unit 50 to rotate in the clockwise direction. As the driving member 56 rotates, the inner driving blocks 565 of the driving member 56 abut against the protruding blocks 542 of the holder 54, and the outer driving blocks 567 abut against the stoppers 583 of the driven member 58, to rotate the driven member 58 and the holder 54 with the driving member 56. The lock holder 54 keeps each of the lock elements 543 in a position corresponding to the center of the inner wall surface 585 of the respective stopper 583 of the driven member 58, i.e., a position where the inner wall surface 585 of the stopper 583 is spaced from the outer wall surface 524 of the sleeve body 523 of the sleeve 52 by the greatest distance, thereby preventing the lock element 543 from moving to the positions corresponding to the sides of the inner wall surface 585 of the stopper 583 in the circumferential direction, and ensuring the driven member 58 is driven smoothly by the driving member 56.

The driven member 58 rotates the input gear 62 of the transmission unit 60 causing the output gear 64 to rotate and drive the sun gear 743. In turn the sun gear 743 drives the output member 80 via the planetary gear sets 74.

The sun gear 743 fixed to the output gear 64 rotates the planet gears 745 of the first stage. Since the planet gears 745 are also engaged with the gear case 72 and the gear case 72 cannot rotate, the planet gears 745 revolves around the sun gear 743 while rotating on its own axis, thus rotating the planet carrier 741 of the first stage to rotate on its own axis, which in turn rotates the sun gear 743 of the second stage as it is fixed to the planet carrier. The second sun gear 743 rotates the second planet gears which in turn rotate the second planet carrier and the output member 80. The rotational speed of the planet carrier 741 is equal to the revolution speed of the planet gear 745 with respect to the sun gear 743. In this way, through the gear transmission structure and the multi-stage transmission of the planetary gear unit 70, the output of the motor 20 is converted into a rotation with a lower speed and a higher torque of the output member 80 fixedly connected to the second planet carrier 741, to apply the brake.

Figure 7:
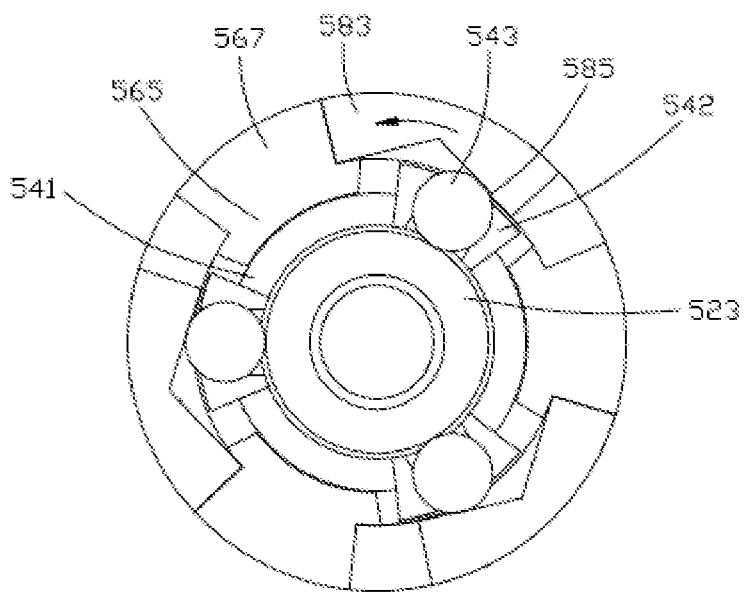
FIG. 7 is a schematic view showing the state of the self-locking unit when the brakes have been applied.

Referring to FIG. 7, after the actuator has applied the brake, if the output member 80 rotates reversely in an attempt to reverse drive the actuator, the reverse rotation is transmitted to the driven member 58 via the planetary gear unit 70 and the transmission unit 60. When the driven member 58 starts to rotate in an anticlockwise direction, the stoppers 583 of the driven member 58 abut against the outer driving blocks 567 of the driving member 56. The driven member 58 pushes the driving member 56 to rotate in the anticlockwise direction. In this way, each of the inner driving block 565 of the driving member 56 is separated from the respective protruding block 542 of the holder 54. In this process, the holder 54 keeps still, and the driven member 58 rotates the driving member 56 with respect to the holder 54 till one side of the inner wall surface 585 of the stopper 583 interferes with the respective lock element 543 which is then wedged between the stopper 583 and the sleeve 52 and stops the driven member from rotating further. Thus also preventing the output member 80 from continuing to rotate and releasing the brake. In this way, the self-locking unit 50 of the actuator of the electric parking brake system according to the present application can avoid the reverse transmission from the output member 80 to the driven member 58 and the driving member 56 via the planetary gear unit 70 and the driving mechanism, and achieve self-locking of the actuator, avoiding unintentional release of the brake.

Figure 8:
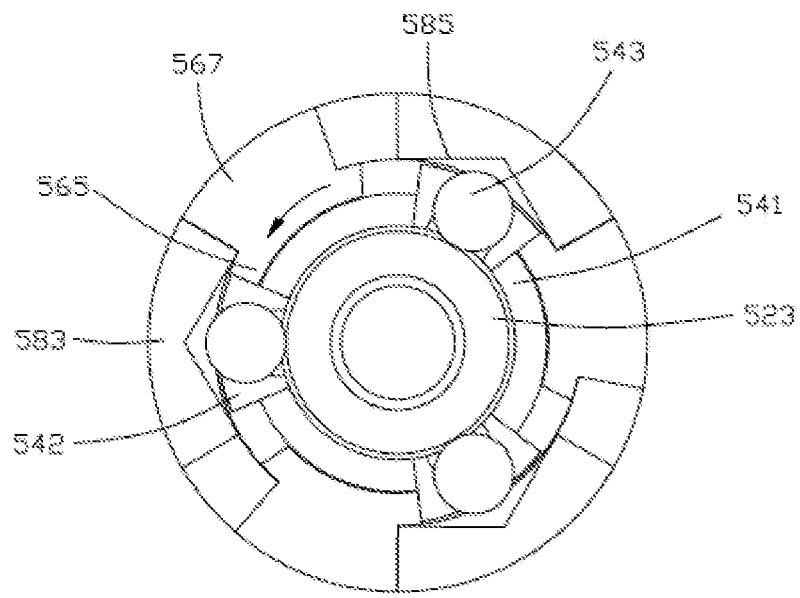
FIG. 8 is a schematic view showing the state of the self-locking unit when releasing the brakes.

Referring to FIG. 8, when the brake is to be released, the motor 20 rotates the shaft 22 and the driving member 56 of the self-locking unit 50 in the anticlockwise direction. The inner driving blocks 565 and the respective protruding block 542, which were in contact with each other previously, are separated from each other, and the outer driving blocks 567 are separated from the respective stoppers 583. In this process, the driven member 58 and the holder 54 keep still, until the driving member 56 has rotated by a certain angle and the inner driving block 565 abuts against another adjacent protruding block 542 and the holder 54 is driven to rotate along with the driving member 56 with respect to the driven member 58, till the lock element 543 moves to the center position of the inner wall surface 585 of the driven member 58. At this time, the outer driving blocks 567 of the driving member 56 abuts against another adjacent stopper 583 to again rotate the driven member 58 with the driving member 56. At this time, the driving member 56, the driven member 58, and the holder 54 again rotate together and the lock element 543 is always kept in the position corresponding to the center of the inner wall surface 585 of the stopper 583, to ensure the driven member 58 is driven smoothly by the driving member 56, and further to drive the output member 80 to rotate reversely via the transmission unit 60 and the planetary gear unit 70, thereby releasing the brake.

Based on the above description, as a driving member, the driving member 56 can drive the driven member 58 to rotate and thus rotate the output member 80 via the transmission unit 60 and the planetary gear unit 70 to operate the brake. Conversely, if the driven member 58 acts as a driving member, its rotation causes interference with the lock element 543 which prevents the driven member 58 from continuing to rotate. That is, the driving member 56 can drive the driven member 58 but the driven member cannot drive the driving member, thus effectively avoiding accidental release of the brake. A low friction, high efficiency transmission can be employed for the transmission between the actuator and the brake, and is not limited by whether the transmission can achieve self-lock. In addition, in braking and subsequent release, when the driving member 56, the driven member 58 and the holder 54 rotate synchronously with the shaft 22 with respect to the sleeve 52, there is no relative rotation between the driving member 56, the driven member 58 and the holder 54. When the driving member 56 is rotating with respect to the driven member 58 there is no contact with the driven member 58 and the holder 54. There is only a low friction contact between the driving member 56 and the sleeve 52. Thus, friction in the self-locking unit is very small, which effectively improves the transmission efficiency of the whole parking brake system.

Figure 9:
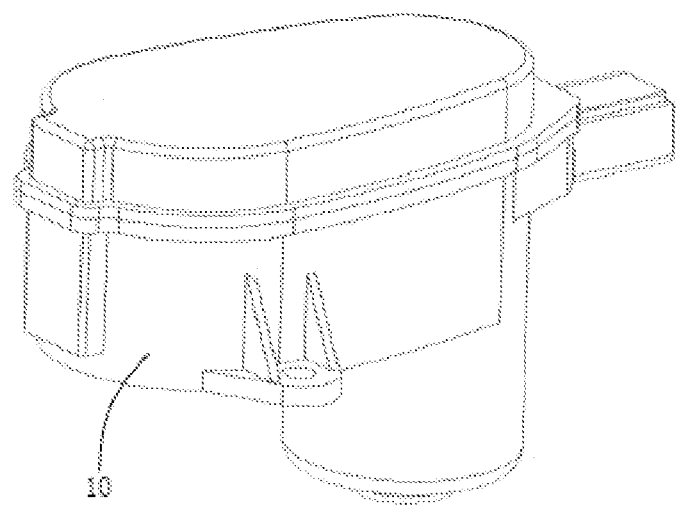
FIG. 9 is a perspective view of an actuator of an electric parking brake system according to another embodiment of the present application.
Figure 10:
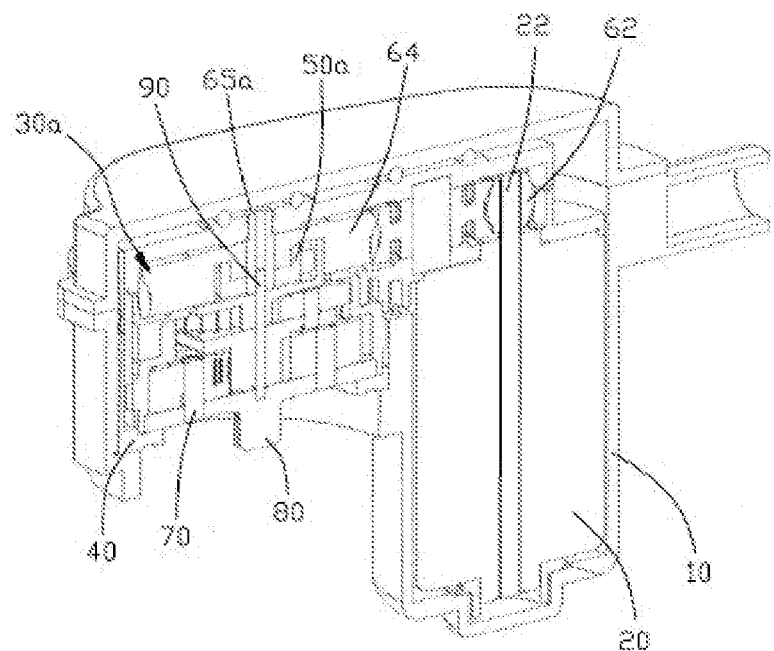
FIG. 10 is a sectional view of the actuator of FIG. 9.

FIGS. 9 and 10 show an actuator of an electric parking brake system according to another embodiment of the present application. In this embodiment, a transmission device 30*a* of the actuator includes a transmission unit 60, a self-locking unit 50*a* and a planetary gear unit 70 which are received in a housing 40. The transmission unit 60 and the planetary gear unit 70 are substantially the same as those in the above first embodiment; however, the connection method is different. Unlike the first embodiment, in this embodiment, the self-locking unit 50*a* is connected between the transmission unit 60 and the planetary gear unit 70. An input gear 62 of the transmission unit 60 is fixedly connected to the shaft 22 to rotate with the shaft 22, the output gear 64 is connected to the driving member 56*a* of the self-locking unit 50*a*, and a sun gear 743 of the planetary gear unit 70 is connected to the driven member 58 of the self-locking unit 50*a*.

Figure 11:
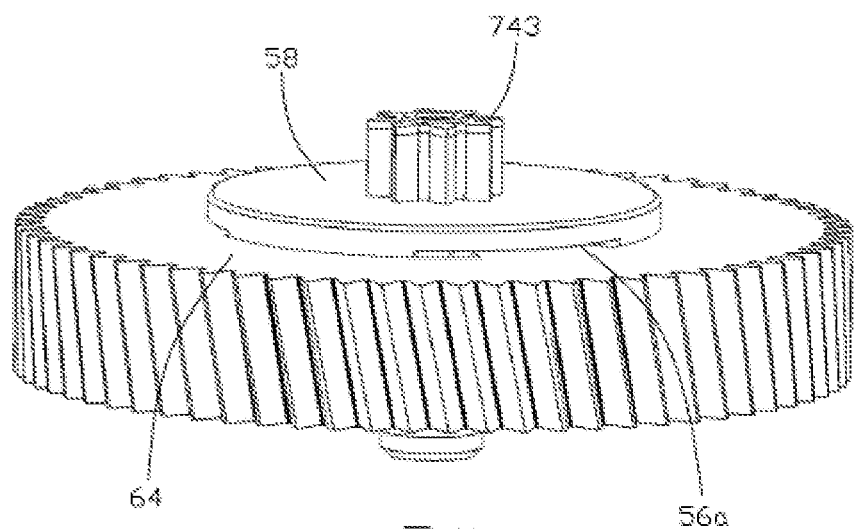
FIG. 11 is an assembly view of a self-locking unit of the actuator of FIG. 9.
Figure 12:
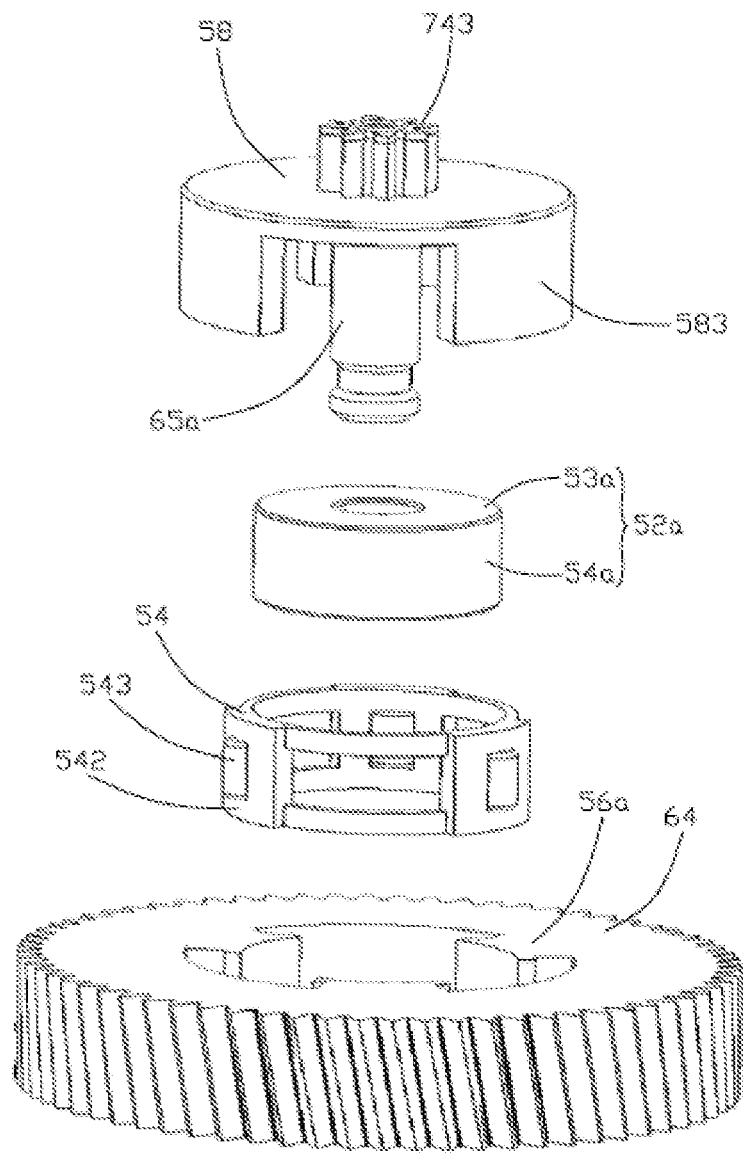
FIG. 12 is an exploded view of the self-locking unit of FIG. 11.
Figure 13:
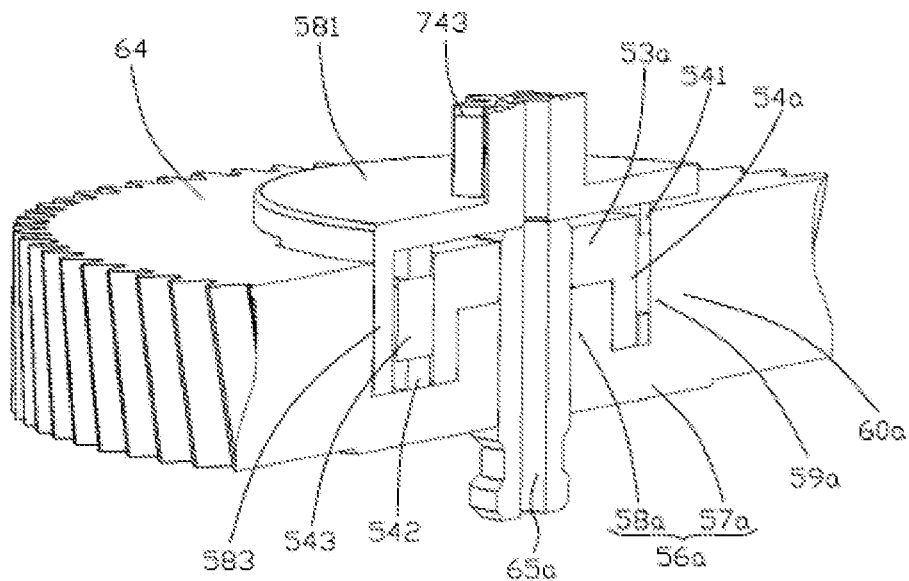
FIG. 13 is a sectional view of the self-locking unit of FIG. 11.

Referring to FIGS. 11, 12, and 13, in this embodiment, a fixed portion 53*a* of a sleeve 52*a* of the self-locking unit 50*a* is fixedly sleeved on a fixed shaft 65*a*. The fixed shaft 65*a* is a hollow shaft rod and has a bottom end (viewed in the direction shown in FIG. 10) slightly protruding out of the fixed portion 53*a*, and a sleeve body 54*a* extends axially from an outer periphery of the fixed portion 53*a* towards a top end of the fixed shaft 65*a*. The sleeve body 54*a* has an outer diameter equal to the diameter of the fixed portion 53*a*, and an inner diameter greater than an inner diameter of the fixed portion 53*a*, that is, greater than the diameter of the fixed shaft 65*a*, thus an annular space is formed between the fixed shaft 65*a* and the sleeve body 54*a* when being assembled.

In this embodiment, the driving member 56*a* and the output gear 64 of the transmission unit 60 are formed integrally, and the output gear 64 surrounds the driving member 56*a*. In other embodiments, the output gear 64 and the driving member 56*a* can be formed separately and then fixedly connected, and the output gear 64 may be directly sleeved on the outer circumference of the driving member 56*a*, or be connected in series with the driving member 56*a* axially, as long as the driving member 56*a* and the output gear 64 cannot rotate with respect to each other. A body 57*a* of the driving member 56*a* is superposed on the sleeve body 54*a*, and the shaft seat 58*a* is rotatably sleeved on the fixed shaft 65*a*, and is received in the annular space between the fixed shaft 65*a* and the sleeve body 54*a*. The height of the shaft seat 58*a* is equivalent to the height of the annular space, and a tail end of the shaft seat 58*a* abuts against the fixed portion 53*a* of the sleeve 52*a* to be positioned in the axial direction. An outer diameter of the shaft seat 58*a* may be slightly smaller than an outer diameter of the sleeve body 54*a*, to avoid friction between the shaft seat 58*a* and the sleeve body 54*a*. Inner driving blocks 59*a* and outer driving blocks 60*a* of the driving member 56*a* extend axially towards the fixed portion 53*a* of the sleeve 52*a* and are spaced from the fixed portion 53*a* in the radial direction, an outer surface of each of the outer driving blocks 60*a* is connected to the output gear 64, and an inner surface of each of the inner driving blocks 59*a* is spaced from the shaft seat 58*a* by a certain distance in the radial direction.

The lock holder 54 is rotatably sleeved on the sleeve body 54a of the sleeve 52a, and is located between the sleeve body 54a and the inner driving block 59a. A connecting portion 581 of the driven member 58 is superposed on the fixed portion 53a of the sleeve 52a, and a stopper 583 extends axially from the periphery of the connecting portion 581 towards the body 57a of the driving member 56a, and protrudes into a position between adjacent outer driving blocks 60a. The axial ends of the holder 54 respectively face the connecting portion 581 of the driven member 58 and the body 57a of the driving member 56a. In this embodiment, the bottom end of the fixed shaft 65a abuts against the connecting portion 581 of the driven member 58, and the planetary gear unit 70 is connected in series via a center shaft 90, and the center shaft 90 passes through the connecting portion 581 to be fixedly connected to the fixed shaft 65a.

Figure 14:
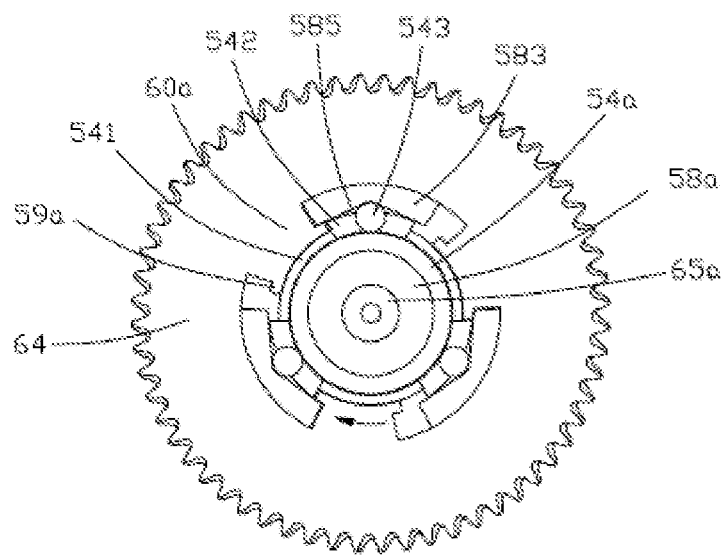
FIG. 14 is a schematic view showing the state of the self-locking unit of FIG. 9 when applying the brakes.

When the actuator of the second embodiment is operated to apply the brake, the rotation of the shaft 22 of the motor 20 is transmitted to the driving member 56a via the transmission unit 60. Similarly, taking the clockwise rotational direction as shown in FIG. 14 as an example, the driving member 56a rotates, and the inner driving block 59a of the driving member 56a abuts against a respective protruding block 542 of the holder 54, and the outer driving block 60a of the driving member 56a abuts against a respective stopper 583 of the driven member 58, thereby rotating the driven member 58 and the holder 54 with the driving member 56a. In this process, the lock elements 543 are retained in a position corresponding to the center of an inner wall surface 585 of the stopper 583, to ensure the driven member 58 is driven smoothly by the driving member 56a and further to rotate the planetary gear unit 70 to drive the output member 80. Thus, rotation of the shaft 22 of the motor 20 is converted to the rotation of the output member 80 with a lower speed and a higher torque, to operate the brake.

Figure 15:
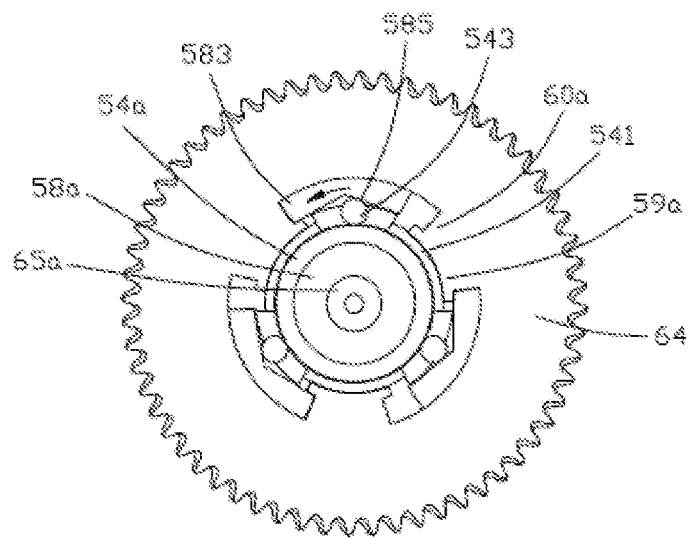
FIG. 15 is a schematic view showing the state of the self-locking unit when the brakes have been applied.

Referring to FIG. 15, once the brake has been applied, if the brake tries to back drive the driven member 58 via the output member 80 and the planetary gear unit 70, the driven member abuts the driving member 56 causing it to move but the lock holder 54 is not moved allowing the lock element 543 to become catch or wedged between the sleeve body 54a and the stopper 583 preventing further rotation of the driven member 58 and thus stopping rotation of the output member 80, preventing release of the brake.

Figure 16:
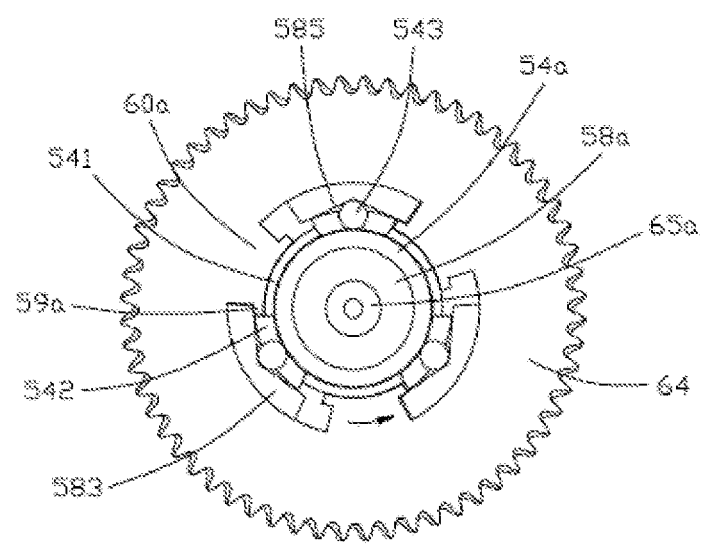
FIG. 16 is a schematic view showing the state of the self-locking unit when releasing the brakes.

Referring to FIG. 16, when the brake is to be released, the motor 20 drives the driving member 56a to rotate in the anticlockwise direction, and the inner driving blocks 59a and the protruding blocks 542 of the holder 54, which are in contact with each other previously, are separated from each other, and the outer driving blocks 60a are separated from the respective stoppers 583, till the inner driving blocks 59a abut against another adjacent protruding block 542 to rotate the holder 54, to push the lock element 543 to the position corresponding to the center of the inner wall surface 585 of the stopper 583. At this time, the outer driving blocks 60a abut against the stoppers 583, and again drives the driven member 58 and the holder 54 to rotate with the driving member 56a. The driving member 56a, the driven member 58 and the holder 54 rotate reversely in the anticlockwise direction together, and drive the output member 80 via the planetary gear unit 70 to rotate reversely, thereby releasing the brake.

Similarly, the actuator of the second embodiment can only transmit torque in one direction from the driving member 56a to the driven member 58, and the driven member 58 cannot drive the driving member 56a. Thus a transmission manner with a low friction and a high efficiency may be employed for the transmission between the actuator and the brake. In operating the brake, the driving member 56a, the driven member 58 and the lock holder 54 rotate together with respect to the sleeve 52a. Friction between the holder 54 and the sleeve 52a during rotation is very small, and the transmission efficiency of the whole parking brake system is improved significantly.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. An actuator of an electric parking brake system, comprising:
   a motor;
   an output member; and
   a transmission device connected between the motor and the output member, the transmission device comprising a housing, and a self-locking unit and a transmission unit that are received in the housing,
   the self-locking unit comprising: a sleeve fixed with respect to the housing, a driving member, a driven member and a holder, all arranged coaxially with the sleeve and are rotatable with respect to the sleeve, the driving member and the driven member having transmission components configured to engage with each other, the holder being rotatably sleeved on the sleeve and located in the driven member, and the holder is provided with a plurality of lock elements,
   wherein each of the lock elements extend beyond the holder in a radial direction, and is located between a radially inner wall surface of the driven member and a radially outer wall surface of the sleeve, a distance between the inner wall surface of the driven member and the outer wall surface of the sleeve is configured to gradually decrease from the center of the inner wall surface of the driven member to two sides of the inner wall surface of the driven member, in a circumferential direction, a greatest distance is greater than a diameter of the lock element, and a smallest distance is smaller than the diameter of the lock element,
   whereby when the driving member rotates the driven member, the holder is rotated by the driving member to maintain the lock elements located approximately at positions corresponding to the greatest distance; and when the driven member rotates without the driving member, the inner wall surface of the driven member rotates with respect to the holder to allow the elements to move towards positions corresponding to the smallest distance, to stop further rotation of the driven member with respect to the sleeve.

2. The actuator of claim 1, wherein the holder protrudes radially outwardly to form a plurality of protruding blocks, and the protruding blocks are arranged at intervals in a circumferential direction of the holder, and each protruding block supports a respective one of the lock elements.

3. The actuator of claim 2, wherein the driven member is provided with a plurality of stoppers spaced at intervals in the circumferential direction of the driven member, the driving member is formed with at least one outer driving block and at least one inner driving block disposed radially inwardly from said at least one outer driving block, each stopper corresponds to one protruding block in the radial direction and is spaced from the protruding block, an inner wall surface of the stopper facing the protruding block is the inner wall surface of the driven member, and the outer driving block protrudes into a position between two adjacent stoppers, the inner driving block protrudes into a position between two adjacent protruding blocks, and the outer driving block together with the stopper form the transmission components.

4. The actuator of claim 3, wherein the inner wall surface of each of the stoppers comprises two intersecting planes, and a projection of the inner wall surface in an axial direction has a V shape.

5. The actuator of claim 3, wherein a plurality of outer driving blocks are provided, and each outer driving block extends radially inwardly to form the respective inner driving block, and in the circumferential direction, the outer driving blocks and the stoppers are alternately arranged, the inner driving blocks and the protruding blocks are alternately arranged, and a distance between adjacent protruding blocks is greater than a width of the inner driving block, and a distance between adjacent stoppers is greater than a width of the outer driving block.

6. The actuator of claim 3, wherein a width of the at least one inner driving block in the circumferential direction is greater than a width of the at least one outer driving block in the circumferential direction, and two sides of the at least one inner driving block protrude beyond the at least one outer driving block.

7. The actuator of claim 1, wherein the sleeve comprises a fixed portion and a sleeve body extending from the fixed portion, and the fixed portion is fixed to the housing.

8. The actuator of claim 1, wherein the transmission unit comprises an input gear and an output gear which are drivably connected, and the self-locking unit is connected between the shaft of the motor and the input gear of the transmission unit.

9. The actuator of claim 8, wherein the driven member of the self-locking unit is integrally formed with the input gear of the transmission unit.

10. The actuator of claim 8, wherein the sleeve comprises a fixed portion and a sleeve body extending from the fixed portion, and the fixed portion of the sleeve and the housing are formed integrally as a monolithic structure by insert molding.

11. The actuator of claim 10, wherein an outer circumference of the fixed portion of the sleeve has a non-circular shape.

12. The actuator of claim 1, wherein the transmission device further comprises a planetary gear unit, and the self-locking unit is connected between the transmission unit and the planetary gear unit.

13. The actuator of claim 12, wherein the transmission unit comprises an output gear, and the driving member of the self-locking unit is fixedly connected to the output gear or is integrally formed with the output gear.

14. The actuator of claim 12, wherein the planetary gear unit comprises a sun gear, and the driven member of the self-locking unit is fixedly connected to the sun gear or is integrally formed with the sun gear.

15. The actuator of claim 12, wherein the transmission device further comprises a fixed shaft fixed to the housing, the sleeve comprises a fixed portion fixedly sleeved on the fixed shaft, and a sleeve body extending axially outwardly from a periphery of the fixed portion, and the sleeve body and the fixed shaft are spaced from each other in the radial direction to form an annular space between the sleeve body and the fixed shaft.

16. The actuator of claim 15, wherein the driving member comprises a body arranged to be superposed on the sleeve body of the sleeve, a shaft seat extending axially from the center of the body, and a driving block extending axially from the body, and the shaft seat is rotatably sleeved on the fixed shaft and is received in the annular space.

17. The actuator of claim 16, wherein the driven member comprises a connecting portion superposed on the fixed portion of the sleeve, and a stopper extending axially from an outer periphery of the connecting portion.

18. The actuator of claim 17, wherein the holder surrounds the sleeve body, and is disposed between the connecting portion and the body.

19. The actuator of claim 1, wherein a rubber gasket is disposed between a casing and the motor.

20. An electric parking brake system incorporating the actuator of claim 1.

* * * * *